(12) United States Patent
Low et al.

(10) Patent No.: US 11,074,720 B1
(45) Date of Patent: Jul. 27, 2021

(54) SYSTEM AND METHOD FOR CALIBRATING INTRINSIC PARAMETERS OF A CAMERA USING OPTICAL RAYTRACING TECHNIQUES

(71) Applicant: Aptiv Technologies Limited, St. Michael (BB)

(72) Inventors: Yew Kwang Low, Singapore (SG); Ronald M. Taylor, Greentown, IN (US)

(73) Assignee: Aptiv Technologies Limited

( * ) Notice: Subject to any disclaimer, the term of this patent is extended or adjusted under 35 U.S.C. 154(b) by 0 days.

(21) Appl. No.: 16/784,560

(22) Filed: Feb. 7, 2020

(51) Int. Cl.
*G06T 7/80* (2017.01)
*H04N 17/00* (2006.01)
*G06T 7/70* (2017.01)
*G02B 27/30* (2006.01)

(52) U.S. Cl.
CPC .............. *G06T 7/80* (2017.01); *G02B 27/30* (2013.01); *G06T 7/70* (2017.01); *H04N 17/002* (2013.01)

(58) Field of Classification Search
CPC .. G06T 7/80; G06T 7/70; G02B 27/30; G02B 27/0068; G02B 27/648; G02B 27/42; G02B 27/4255; G02B 27/4277; H04N 17/002; G01C 11/02; G01M 11/0221
USPC ........................................................ 348/180
See application file for complete search history.

(56) References Cited

U.S. PATENT DOCUMENTS

| | | | | |
|---|---|---|---|---|
| 3,912,395 A * | 10/1975 | Voggenthaler | ......... | G02B 27/42 356/124 |
| 5,455,715 A * | 10/1995 | Okubo | ................. | H04N 5/2254 359/827 |
| 5,988,862 A * | 11/1999 | Kacyra | ................ | G01B 11/002 382/195 |
| 6,863,216 B2 * | 3/2005 | Tsikos | .................... | G02B 26/10 235/462.01 |
| 7,023,472 B1 * | 4/2006 | Kang | ........................ | G06T 7/80 348/175 |
| 7,155,030 B2 * | 12/2006 | Kim | ........................ | G06T 7/80 382/100 |
| 7,496,241 B1 * | 2/2009 | Reneker | ................ | G01C 11/02 382/260 |

(Continued)

FOREIGN PATENT DOCUMENTS

GB 2517068 A 2/2015

OTHER PUBLICATIONS

U.S. Appl. No. 16/746,329, Optics Device for Testing Cameras Useful on Vehicles, filed Jan. 17, 2020, Baar, et al.

*Primary Examiner* — Brian P Yenke
*Assistant Examiner* — Sean N Haiem
(74) *Attorney, Agent, or Firm* — Billion & Armitage

(57) ABSTRACT

A method of calibrating intrinsic parameters associated with a camera includes positioning a camera to receive collimated light from a rotatable collimator, wherein the collimated light is provided to the camera via a target having a central target aperture and a plurality of peripheral target apertures located on a periphery of the target. The method further includes rotating the collimator along a first axis extending through an entrance pupil location of the camera and recording spot positions associated with collimated light provided through one or more target apertures of the target at each first axis interval and determining a distortion profile associated with the camera based on the recorded spot positions measured at the plurality of first axis intervals.

20 Claims, 7 Drawing Sheets

(56) References Cited

U.S. PATENT DOCUMENTS

| | | | | |
|---|---|---|---|---|
| 9,213,228 B2* | 12/2015 | Apel | ............... | G02B 27/30 |
| 9,330,463 B2* | 5/2016 | De Villiers | ............... | G06T 7/80 |
| 9,535,257 B2* | 1/2017 | Johnson | ............... | G02B 27/62 |
| 10,460,473 B1* | 10/2019 | McMichael | ............... | H04N 17/002 |
| 10,785,474 B1* | 9/2020 | Semansky | ............... | G05D 1/0246 |
| 2003/0034396 A1* | 2/2003 | Tsikos | ............... | G02B 19/0014 |
| | | | | 235/454 |
| 2007/0104353 A1* | 5/2007 | Vogel | ............... | G01C 15/00 |
| | | | | 382/106 |
| 2015/0138372 A1* | 5/2015 | Apel | ............... | G02B 27/36 |
| | | | | 348/188 |
| 2015/0277135 A1* | 10/2015 | Johnson | ............... | G02B 27/30 |
| | | | | 359/641 |
| 2015/0305696 A1* | 10/2015 | Yamakawa | ............... | A61B 6/14 |
| | | | | 378/19 |
| 2015/0370061 A1* | 12/2015 | Weaver | ............... | G02B 21/008 |
| | | | | 348/239 |
| 2018/0232910 A1* | 8/2018 | Mead | ............... | G06T 17/20 |
| 2019/0227199 A1* | 7/2019 | Kao | ............... | G02B 27/0955 |

* cited by examiner

SYSTEM AND METHOD FOR CALIBRATING INTRINSIC PARAMETERS OF A CAMERA USING OPTICAL RAYTRACING TECHNIQUES

FIELD

This disclosure is generally directed to camera calibration and more specifically to camera calibration using optical raytracing techniques.

BACKGROUND

Camera calibration is the process of estimating intrinsic and/or extrinsic parameters. In particular, intrinsic parameters deal with the camera's internal characteristics, such as, its focal length, skew, distortion, and image center. Intrinsic parameters are utilized to build a distortion profile that is stored in the non-volatile memory of the camera and utilized to correct for the distortion caused by the intrinsic parameters of the camera.

Typically, camera calibration relies on fixing the camera in a given location and providing a target image (e.g., checkerboard pattern) with known parameters. A plurality of images are taken by the camera at different orientations and angles and analyzed to determine the intrinsic parameters associated with the camera. However, this type of calibration requires a large amount of space (for example, 3-10 meters) in order to gather image data including the entire field-of-view of the camera. It would be beneficial to develop a system and method of providing camera calibration while reducing the amount of space required.

SUMMARY

According to some aspects, a method of calibrating intrinsic parameters associated with a camera includes positioning a camera to receive collimated light from a rotatable collimator, wherein the collimated light is provided to the camera via a target having a central target aperture and a plurality of peripheral target apertures located on a periphery of the target. The method further includes rotating the collimator along a first axis extending through an entrance pupil location of the camera and recording spot positions associated with collimated light provided through one or more target apertures of the target at each first axis interval and determining a distortion profile associated with the camera based on the recorded spot positions measured at the plurality of first axis intervals.

According to another aspect, a camera calibration system is provided that includes a rotatable collimator and a camera fixture. The rotatable collimator includes a tube and a target located within the tube, the target having a central target aperture and a plurality of peripheral target apertures located radially outward of the central target aperture, wherein the rotatable collimator is rotatable about a first axis. The camera fixture is configured to receive a camera and to locate an entrance pupil location of the camera through the first axis of the rotatable collimator.

DETAILED DESCRIPTION

The present disclosure is directed to an optical raytracing method of calibrating intrinsic parameters of a camera. The system includes a target backlit by a collimated light source, the target having a central aperture and a plurality of peripheral apertures, each of which can be selectively opened and closed. The collimator and target are rotatable about an axis extending through an entrance pupil location of the camera and approximately perpendicular to an optical axis of the camera.

During calibration, collimated light is provided to the camera via the one or more apertures in the target (i.e., target apertures). The camera is aligned such that the optical center of the camera sensor is aligned with the center target aperture, while collimated light from each peripheral target aperture remains visible and focused on the image plane. The orientation of the camera is adjusted (via six-axis alignment controller) until the spot created by collimated light through the plurality of target apertures (i.e., LX, RX, LY, and UY) are focused and at a maximum intensity. When each is visible and focused the peripheral target apertures are turned OFF (i.e., closed) and the principal point (PP) is determined based on collimated light provide through the OA aperture.

Having aligned the collimator with the camera and identified the principal point, the collimator and target are rotated (together) about the axis extending through the entrance pupil location of the camera (and approximately perpendicular to an optical axis of the camera) and distortion of the plurality of points is measured (i.e., location of the points on the sensor). The plurality of measurements are utilized to build a distortion profile that defines the intrinsic parameters of the camera. In this way, the principal point (PP), center of distortion (COD), and focal length (FL) can be determined along with the distortion profile for the camera. The distortion profile may be stored to non-volatile memory associated with the camera. In particular, the FL is determined based on the lateral displacement of the OA spot when the collimator is rotated over a small portion of the paraxial field (i.e., rotated about the paraxial, perpendicular to the rotation about the x-axis and y-axis).

Figure 1:
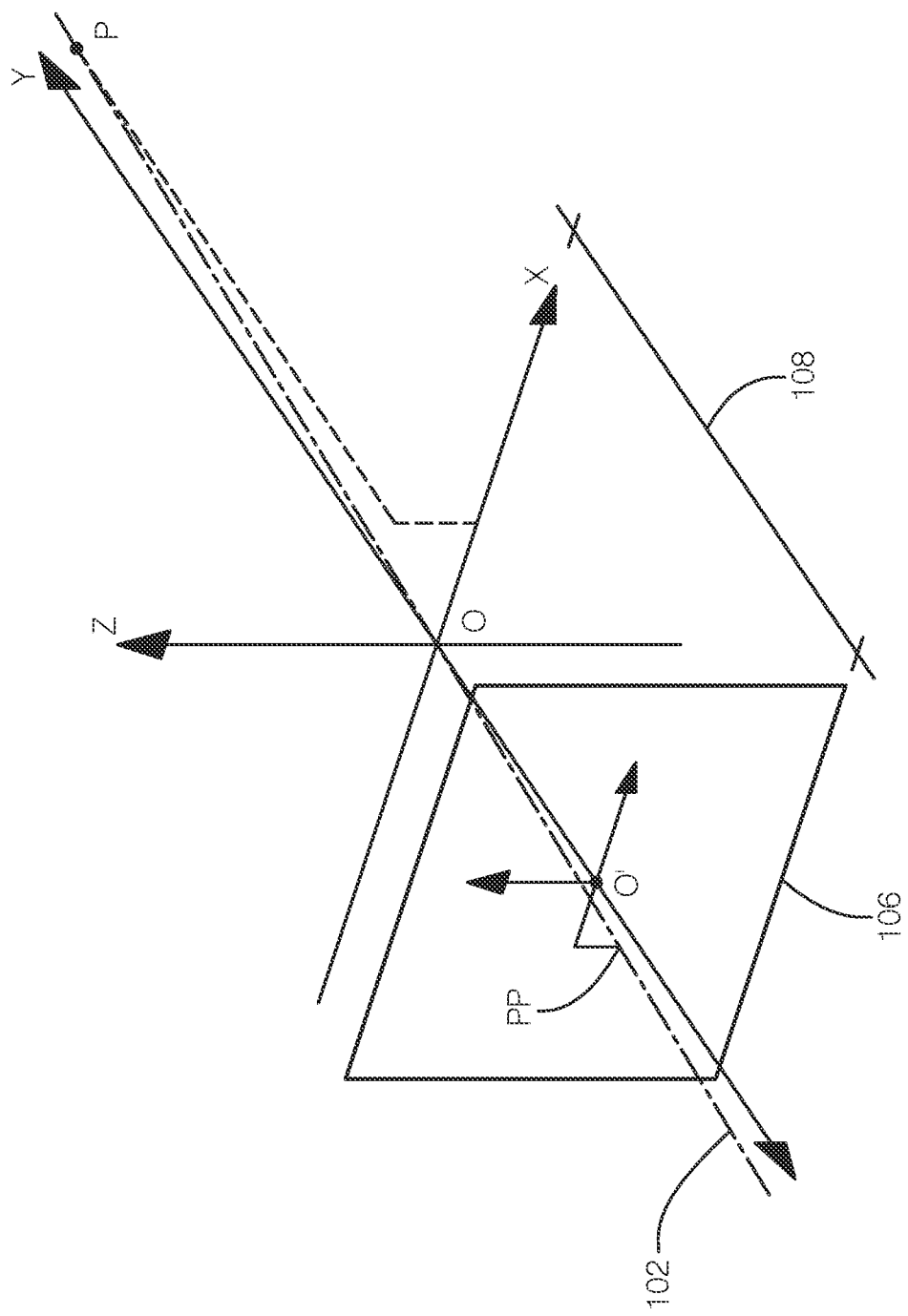
FIG. 1 is a diagram illustrating definitions of the image plane, optical axis, focal length, and camera sensor.
Figure 2:
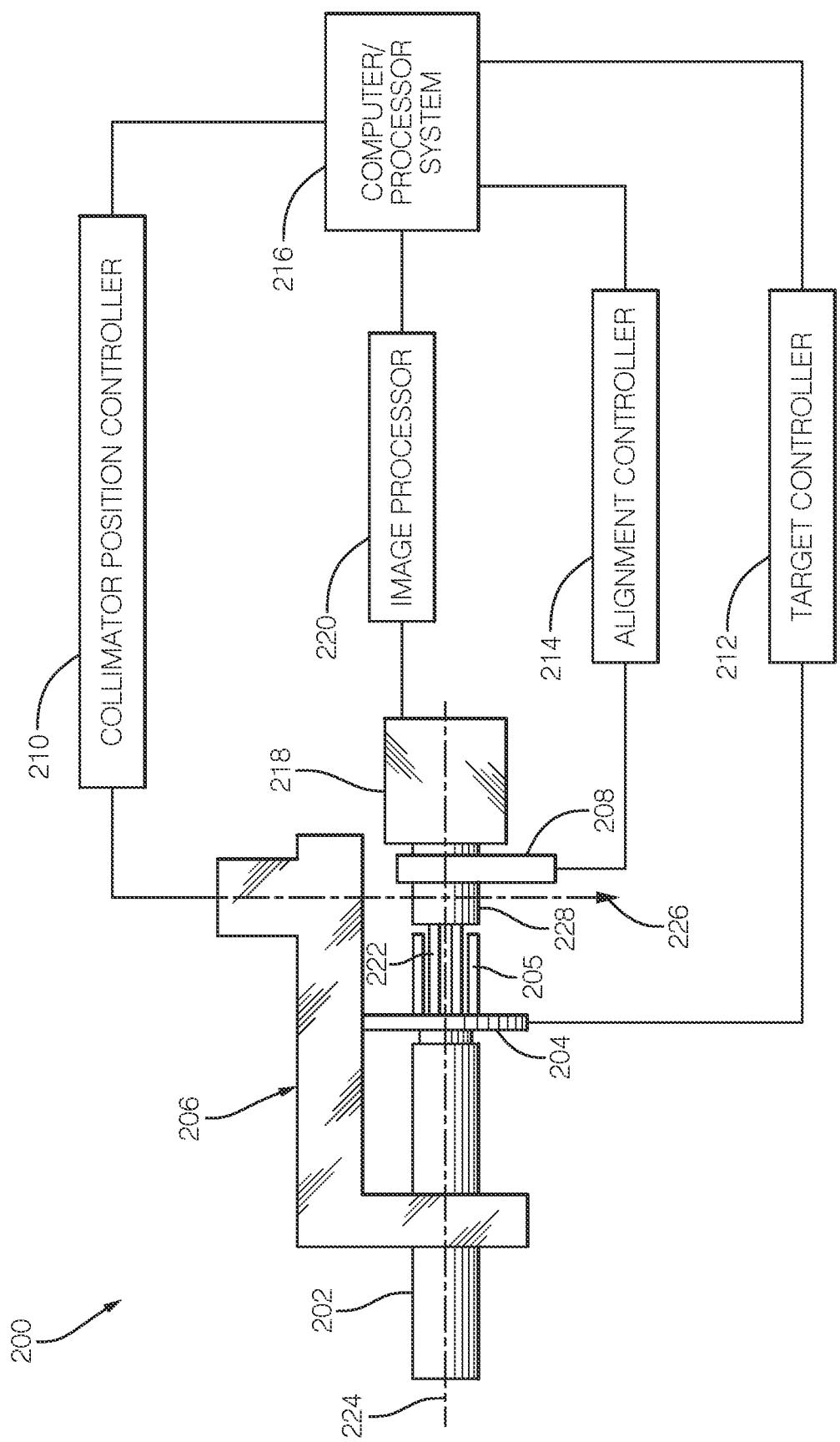
FIG. 2 is a block diagram of the camera calibration system according to some embodiment.

FIG. 1 is a diagram illustrating definitions of optical terminology used throughout the application. A 3D orthogonal coordinate system x, y, z is centered at point O, which represents the lens entrance or aperture. An image plane 106 is located behind the lens entrance defined by point O. The centerpoint of the image plane 106 is aligned with the lens entrance. However, due to distortions of the lens system, the optical axis 102 is not aligned perfectly with the centerpoint (referred to herein as O') of the image plane 106. The point where the optical axis 102 intersects the image plane 106 is referred to as the principal point PP. The distance 108 from point O to the principal point PP represents the focal length of the camera system. Distortion of the lens system results in the principal point PP being offset from the centerpoint of the image plane (represented by point O'). As discussed in more detail below, calibration of the intrinsic parameters of the camera requires identifying the principal point PP and the optical axis 102 of the camera system.

With reference to FIGS. 2-6, the components of a camera calibration system 200 are illustrated according to some embodiments. In general, camera calibration system 200 is configured to calibrate the intrinsic parameters of a camera 218. In the block diagram shown in FIG. 2, the camera calibration system 200 includes a collimator 202, a target 204, a collimator/target fixture 206, camera fixture 208, collimator position controller 210, target controller 212, camera alignment controller 214, and computer/processor system 216.

Collimator/target fixture 206 is configured to hold collimator 202 and target 204. In some embodiments, collimator/target fixture 206 is rotatable about an axis 226. In some embodiments, axis 226 extends through the aperture/entrance pupil location 228 of the camera 218, wherein the axis 226 is approximately perpendicular to the optical axis 224 of the camera 218. Collimator position controller 210 is configured to control the rotation of the collimator/target fixture 206. Likewise, camera fixture 208 is configured to hold camera 218 and camera alignment controller 214 is configured to modify the position/orientation of camera 218. In some embodiments, camera alignment controller 214 modifies the position/orientation of camera 218 in six degrees of freedom. Target controller 212 is configured to selectively open/close the target apertures associated with target 204.

Figure 3:
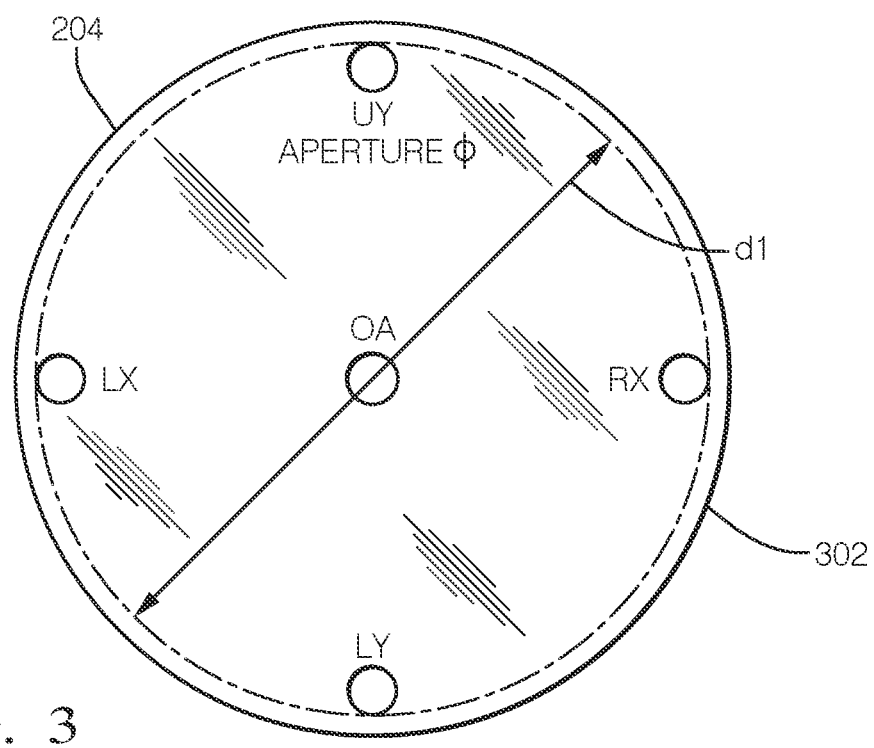
FIG. 3 is a front view of a target having a plurality of peripheral apertures and a central aperture according to some embodiments.

With respect to FIG. 3, a front view of the target 204 is shown that illustrates the plurality of target apertures labeled UY, LY, RX, LX, and OA. In some embodiments, a plurality of peripheral target apertures (e.g., UY, LY, RX, LX) are spaced equidistantly around the target 204, wherein the location of the peripheral target apertures is defined by a circle 302 having a first diameter d1. As discussed in more detail below, in some embodiments each of the plurality of target apertures is selectively opened/closed by target controller 212. In some embodiments, the first diameter d1 is approximately equal to a clear aperture diameter d3 at the optical axis of the lens aperture 228 (shown in FIG. 4). In other embodiments, the first diameter d1 is slightly less than the clear aperture diameter d3 of the lens aperture 228. As discussed in more detail below, in some embodiments each of the plurality of target apertures UY, LY, RX, LX, and OA may be selectively opened/closed to determine the collimated light provided to the lens aperture 228 of camera 218. In some embodiments, target controller 212 is configured to selectively open/close the plurality of target apertures UY, LY, RX, LX, and OA based on commands provided by computer/processor system 216. In some embodiments, for example as shown with respect to FIG. 6, switching magnets are utilized to selectively open/close the plurality of target apertures UY, LY, RX, LX, and OA.

Figure 4:
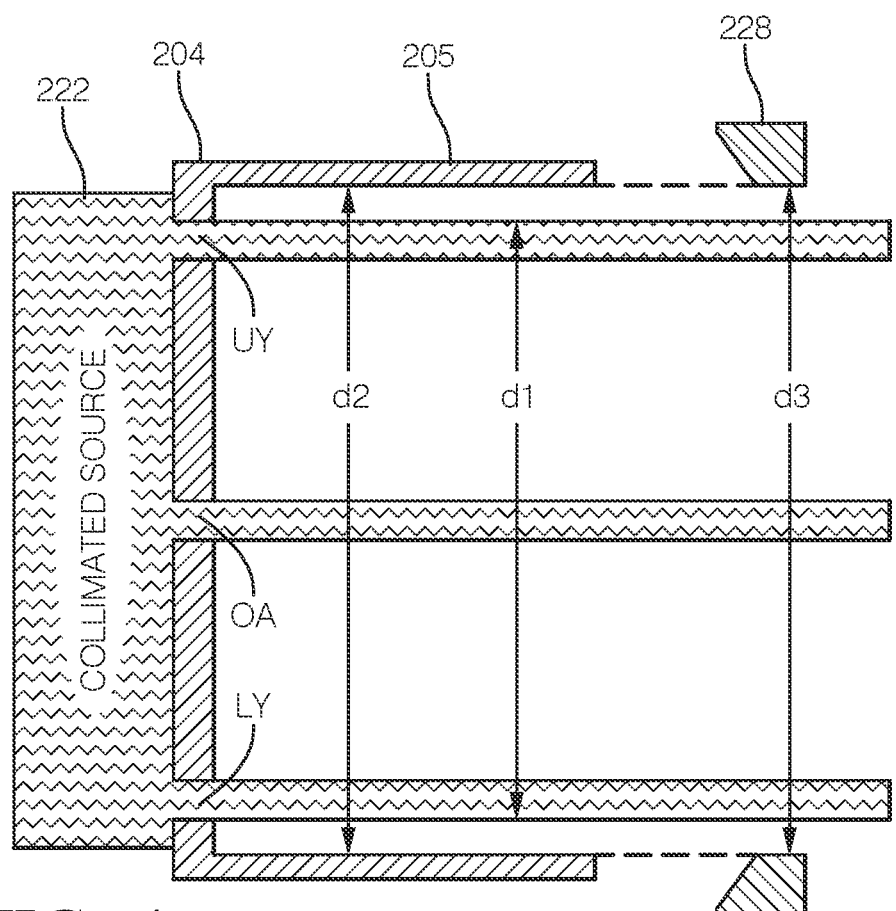
FIG. 4 is a cross-sectional diagram of the collimated light source, target, and tube utilized to provided collimated light to the lens aperture according to some embodiments.

With respect to FIG. 4, a cross-sectional view of collimated light 222 being provided by target 204 to the aperture 228 of camera 218 is illustrated. In the embodiment shown in FIG. 4, collimated light source 222 is incident on target 204, wherein collimated light is provided through the plurality of opened target apertures—such as UY, OA, and LY in the embodiment shown in FIG. 4. As a result, a plurality of collimated light beams are provided via the target apertures UY, OA, and LY to lens aperture 228. In the embodiment shown in FIG. 4, a tube 205 directs the collimated light to lens aperture 228 and prevents stray light from other sources from being incident on lens aperture 228. In some embodiments, tube 205 has a diameter d2 that is approximately equal to the clear aperture diameter d3 of the lens aperture 228. In some embodiments, the diameters d2 and d3 are greater than the diameter d1 of the peripheral target apertures UY, LY, RX, and LX located on the target 204. As described in more detail below, camera 218 is positioned to align the camera aperture 228 with the collimator 202, target 204 and tube 205 such that collimated light source provided via each of the target apertures is incident on the camera aperture 228.

Figure 5A:
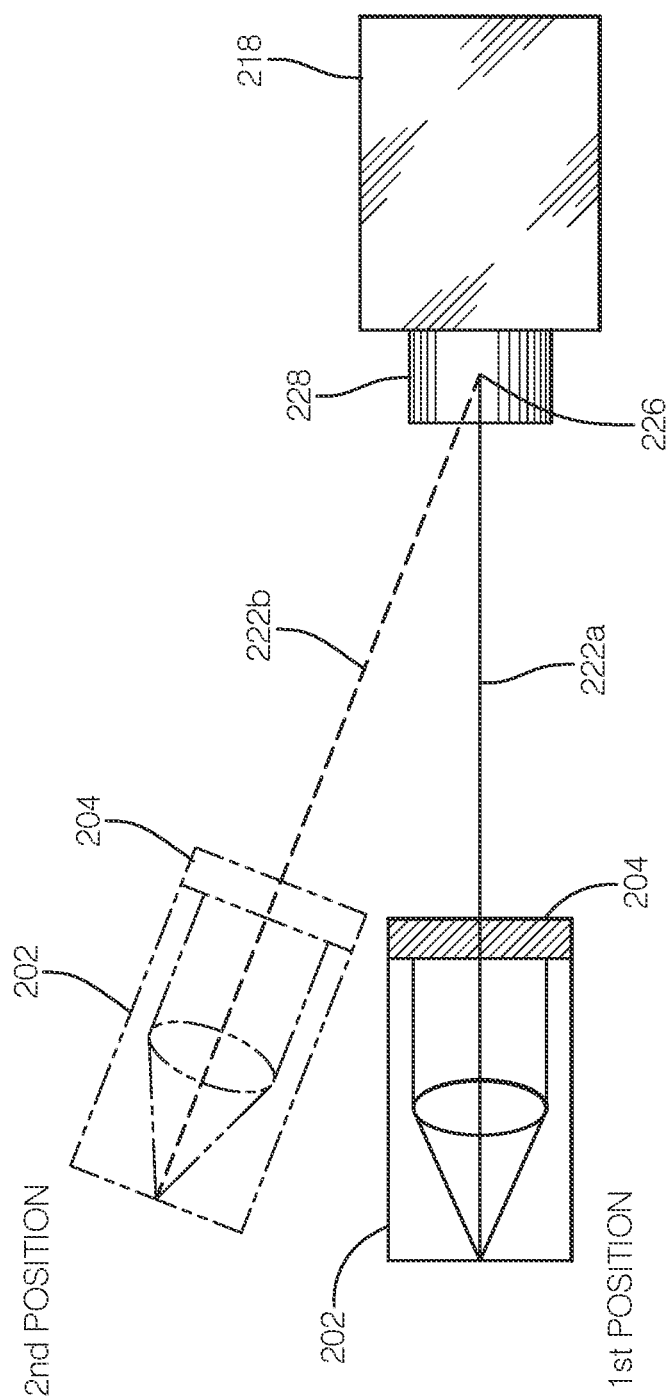
FIG. 5a is a block diagram illustrating rotation of the collimator about an axis extending through an entrance pupil location of the camera according to some embodiments.

With respect to FIG. 5a, collimator 202 is shown in a first position and a second position. As discussed in more detail below, during the calibration process, collimator 202 and target 204 are rotated by collimator collimator/target fixture 206 (not shown) about an axis 226 extending through the entrance pupil location 228 of the camera 218 (axis 226 shown with extending into the page in FIG. 5a). Having initially aligned collimator 202 and target 204 with camera 218, rotation of the collimator 202 and target 204 about axis 226 (extending into the page) ensures that collimated light is incident on the entrance pupil location 228 of the camera 218. For example, in the embodiment shown in FIG. 5a, collimator 202 and target 204 are rotated about axis 226 (into the page) through entrance pupil location 228. Because the axis of rotation 226 is through the center of entrance pupil location 228, collimated light provided by collimator 202 and target 204 is incident on the entrance pupil location 228 at both the first position and the second position (albeit at a different angle of incidence).

Figure 5B:
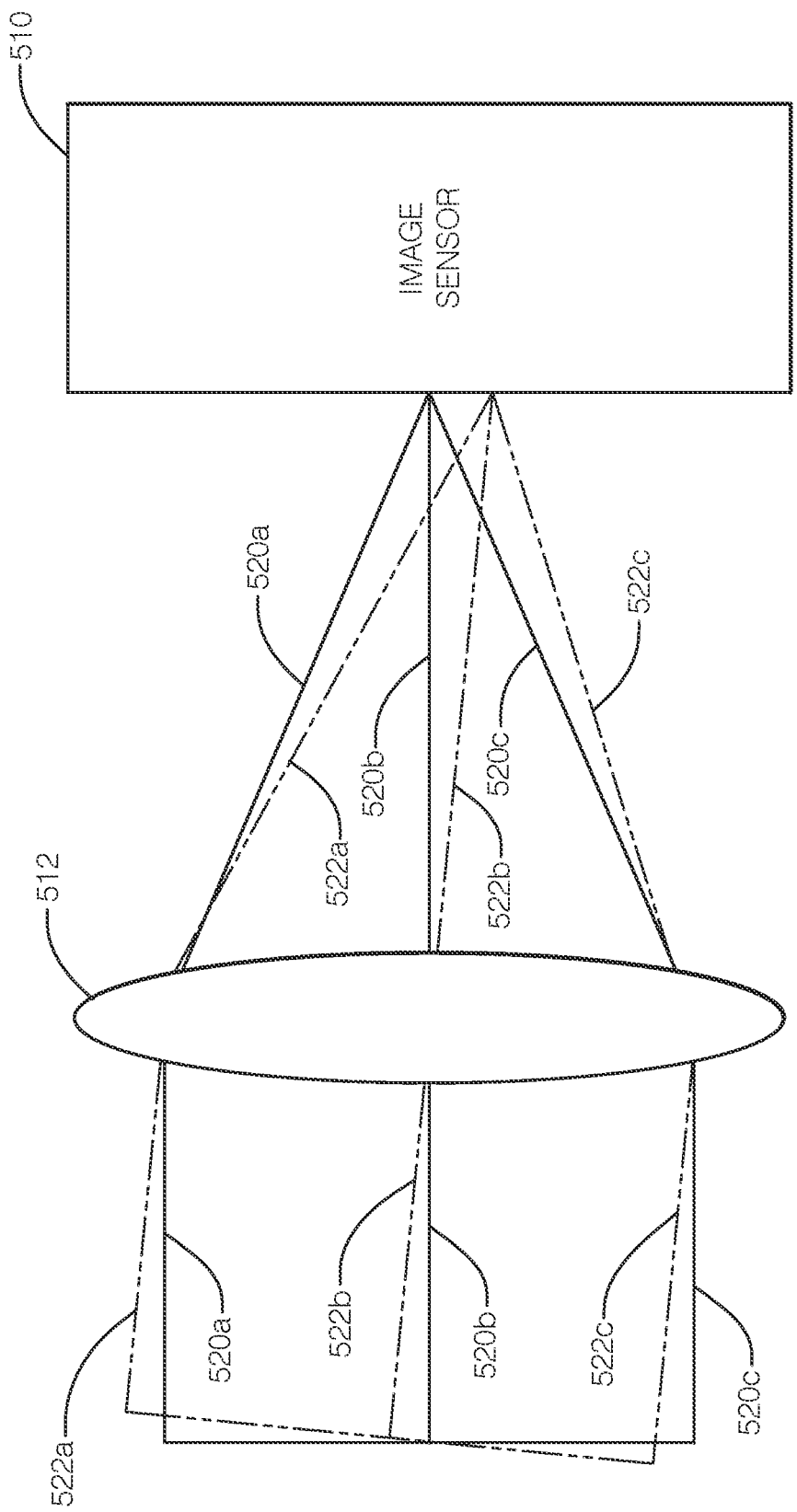
FIG. 5b is a raytracing diagram illustrating the path of collimated light rays provided at different angles through a lens of a camera according to some embodiments.

With respect to FIG. 5b, components of camera 218 are illustrated receiving collimated light from the collimator 202 in a first position and a second position. Components illustrated here include camera lens 512 and image sensor 510, wherein camera lens 512 acts to focus incident light onto the surface of image sensor 510. Because the incident angle of collimated light on the lens 512 is known and the intersection of the collimated light with the image sensor 510 is known, the path of the collimated light through the lens 512 and onto the image sensor 510 can be determined. In this way, raytracing techniques are utilized to determine the distortions associated with the lens 512.

In addition, FIG. 5b illustrates the rotation of the collimator 202 and target 204 from a first position to a second position, and the corresponding effect of rays provided to the image sensor 510. For example, when collimator 202 and target 204 are in a first position, collimated light 520a, 520b, and 520c from a plurality of target apertures is provided to camera lens 512, which focuses the plurality of light rays 520a, 520b, and 520c onto the surface of image sensor 510. Because the light incident on the camera lens 512 is collimated, a perfect lens would focus the rays provided from each of the plurality of target apertures (e.g., rays 520a, 520b, and 520c) onto the same point on the image sensor 510. Distortions in the camera lens 512 will cause the projection of the rays onto the image sensor 510 to be imperfectly focused on a single location. Collimator 202 and target 204 are rotated to a second position and collimated light 522a, 522b, and 522c is provided to camera lens 512, albeit at a different angle than that provided in the first position. As a result, collimated light 522a, 522b, and 522c is focused onto a slightly different location on image sensor 510. In a perfect lens the collimated light 522a, 522b, and 522c would be focused on the same location onto the image sensor 510—albeit a different location onto the image sensor as compared with collimated light provided from the first position. Distortions in the camera lens 512 cause the collimated light 522a, 522b, and 522c to be imperfectly focused on a single location. As discussed in more detail below, based on knowledge regarding the location of the collimator 202 and target 204 (i.e., angular interval of the movement) and the monitored location of the collimated light onto the image sensor 510, the intrinsic parameters of the camera system—including camera lens 512—are determined.

Figure 6:
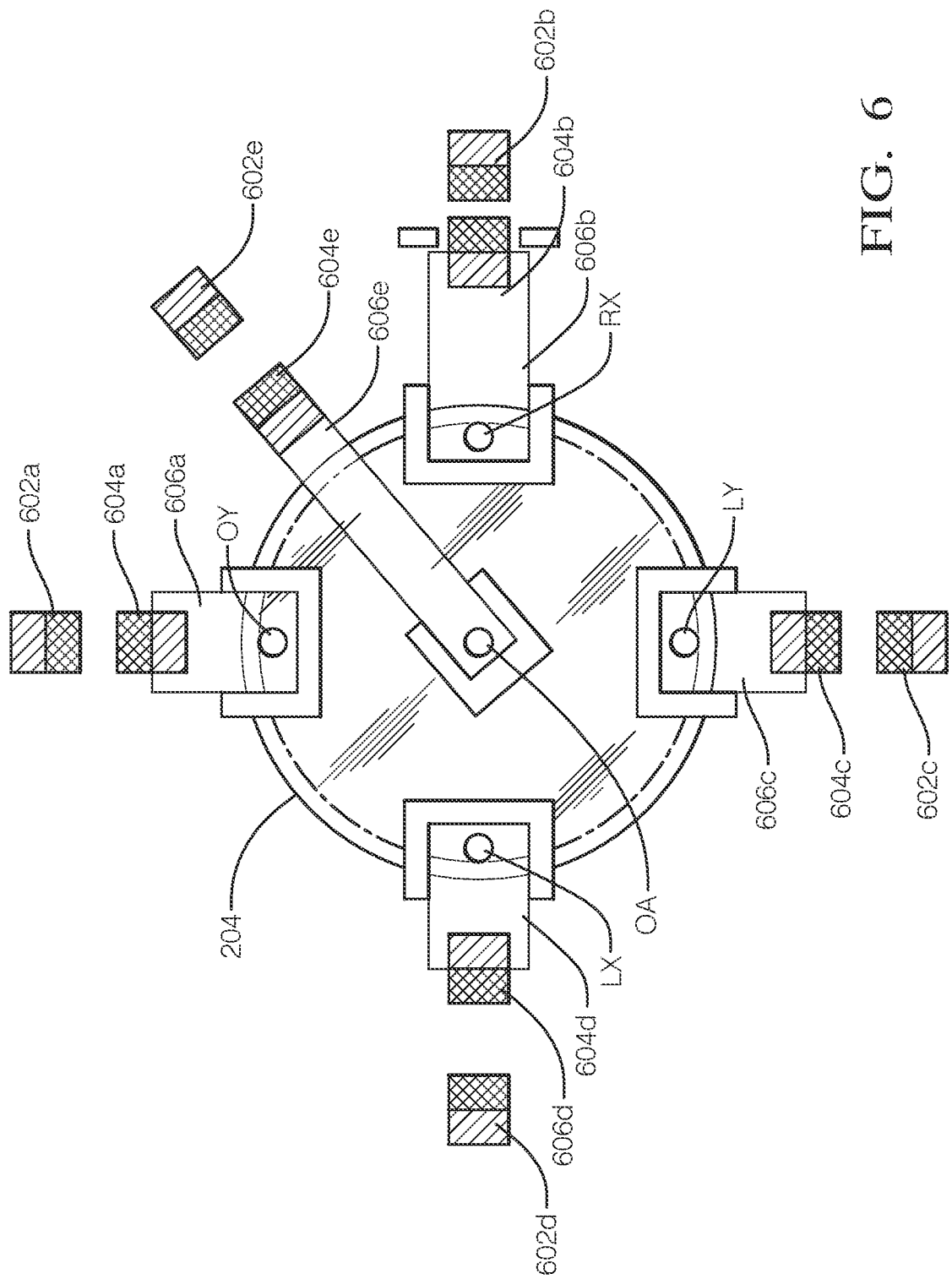
FIG. 6 is a front view of the plurality of magnetic switches utilized to selectively open and close the apertures on the target according to some embodiments.

With respect to FIG. 6, a system for selectively opening/closing the plurality of target apertures UY, LY, RX, LX, and OA is shown that utilizes switches magnets 602a, 602b, 602c, 602d, and 602e, a plurality of fixed magnets 604a, 604b, 604c, 604d, and 604e, and a plurality of blocking plates 606a, 606b, 606c, 606d, and 606e. In some embodiments, the plurality of blocking plates 606a-606e are positioned with respect to each of the plurality of target apertures UY, LY, RX, LX, and OA, respectively, and have a first position in which the blocking plate is positioned over the respective target aperture effectively blocking the transmission of collimated light and a second position in which the blocking plate is moved toward the switching magnet, uncovering the respective aperture. The position of blocking plates 606a-606e is determined based on the magnetism of switching magnets 602a-602e, respectively. The magnetism of the switching magnets 602a-602e is determined and selectively controlled by target controller 212. For example, to close the target aperture OY the switching magnet 602a is controlled such that the portion of the magnet facing fixed magnet 604a is of the same polarity, causing fixed magnet 604a and blocking plate 606a to be moved away from the switching magnet 602a. As a result, blocking plate 606a is moved into position over the aperture OY, covering the aperture and preventing collimated light to pass through. With respect to aperture RX, the switching magnet 602b is controlled such that the portion closest to fixed magnet 604b is of a different polarity, causing the fixed magnet 604b to move towards the switching magnet 602b and thereby causing blocking plate 606b to uncover target aperture RX. In this way, target controller 212 is capable of selectively controlling the position of the plurality of blocking plates, allowing target controller 212 to control which of the plurality of target apertures provide collimated light to camera 218.

Figure 7:
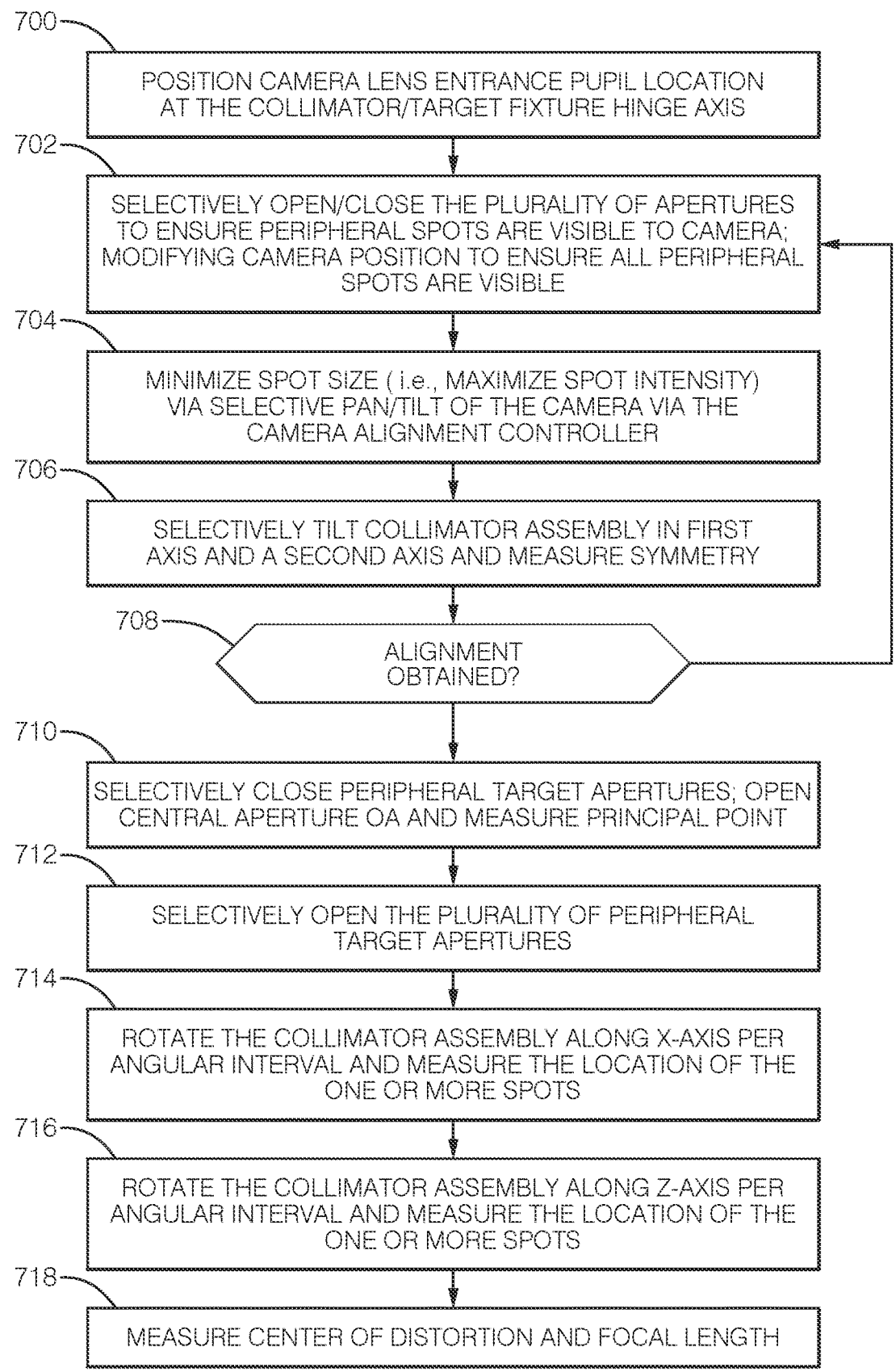
FIG. 7 is a flowchart that illustrates a method of calibration intrinsic parameters of a camera utilizing optical raytracing according to some embodiments.

With continuing reference to FIGS. 2-6, the process of calibrating the intrinsic parameters of the camera 218 is described with respect to the flowchart shown in FIG. 7.

At step 700, the camera 218 is placed in the camera fixture 208 to receive collimated light from the collimator 202. In particular, the camera 218 is positioned so that the lens entrance pupil location is located at the hinge axis of the collimator 202. In this way, the axis of rotation of the collimator extends through the lens entrance pupil location of the camera. Target 204 is located between the light source utilized to generate the collimated light and the camera 218. In some embodiments, at step 700 the position of camera fixture 208 and therefore of camera 518 is selectively controlled via alignment controller 214 (shown in FIG. 2) to provide focus collimated light onto the center location of the image sensor 510 (as shown in FIG. 5b). In some embodiments, only the central target aperture OA is opened during this initial alignment of the camera 218 with the collimator 202 and target 204. Image processor 220 (shown in FIG. 2) receives images captured by the image sensor 510 and calculates one or more attributes of the captured image (e.g., spot location, spot intensity, etc.). Computer/processor system 216 receives the feedback provided by image sensor 510 and utilizes the information to provide control signals to alignment controller 214 and target controller 212.

In some embodiments, at step 702 the plurality of peripheral target apertures UY, LY, RX, and LX are selectively opened and closed to ensure that each of the plurality of peripheral spots are visible to the camera. At this point, the position of the spots on the image sensor 510 is unimportant. However, if a target aperture is opened (e.g., UY) and no corresponding spot is detected by the image sensor 510, this is an indication of a misalignment between the collimator 202 and camera 218. At step 702, in the event a peripheral spot is not detected by image sensor 510 then the position of the camera 218 is modified by alignment controller 214 until each of the plurality of peripheral spots is detected at a particular orientation of the camera 218.

At step 704, target controller 212 controls the plurality of target apertures UY, LY, RX, LX, and OA to an open position and the size and/or intensity of the corresponding spot on the image sensor 510 is measured by image processor 220. The alignment controller 214 selectively modifies the position of camera fixture 208 and therefore of the camera 218 (e.g., pans/tilts) to minimize the size of the spot and/or maximize the intensity of the spot generated as a result of collimated light provided via the plurality of target apertures UY, LY, RX, LX, and OA. A minimum spot size and/or maximum intensity spot indicates the camera 218 is well-aligned with the collimator 202 and target 204. In some embodiments, the size of the spot (as measured by image processor 220 and/or computer/processor system 216) is compared to a minimum size threshold to determine whether proper alignment has been obtained. In other embodiments, the spot intensity (again, measured by image processor 220 and/or computer processor system 216) is compared to a maximum spot intensity threshold to determine whether proper alignment has been obtained. In other embodiments, the position of the camera 218 is modified via pan/tilt operations) and measurements are taken until the minimum size (while ensuring all peripheral spots are still visible) and/or maximum intensity is obtained relative to neighboring locations.

Having aligned camera 218 with the collimator 202 and target 204 at steps 702 and 704, at step 706 the collimator assembly 206 is rotated about one or more of the x-axis and z-axis (as shown in FIG. 1). In some embodiments, the rotation of the collimator assembly 206 is controlled in both directions to the same value (e.g., one degree). In some embodiments, collimator assembly 206 is rotated about only one axis (e.g., x-axis or z-axis) at a time. The location, intensity, and/or size of the spot projected onto the image sensor 510 is measured by the image processor 220 and utilized by computer/processor system 216 to determine the symmetry associated with the camera 218 (in particular, camera lens 512, shown in FIG. 5b).

At step 708 a determination is made whether proper alignment of the camera 218 and the collimator 202 has been obtained. If not, steps 702, 704 and 706 are repeated until proper alignment is achieved. In some embodiments, proper alignment is determined based on a comparison of measured spot sizes, intensities, and/or locations relative to threshold values. In other embodiments, proper alignment is determined based on a comparison of the measured spot sizes, intensities, and/or locations relative to adjacent positions of the camera 218, wherein the best fit is selected as the proper alignment. In some embodiments, a combination of comparison to thresholds and adjacent positions is utilized to determine whether proper alignment has been obtained.

At step 710, having determined that the camera 218 is properly aligned with the collimator 202 and target 204, the target controller 212 selectively closes the plurality of peripheral target apertures UY, LY, RX, and LX located on target 204 and selectively opens or maintains in an open position central target aperture OA. The position of the spot generated on the image sensor 510 (i.e., the particular pixel or group of pixels associated with the image sensor) as a result of the collimated light provided via central target aperture OA is identified as the principal point of the optical system. As discussed above, the principal point represents the point at which the optical axis of the system (i.e., camera lens 512) intersects the image plane (i.e., image sensor 510). The location of the principal point is stored by the computer/processor system 216.

At step 712, the computer/processor system 216 instructs the target controller 212 to open the plurality of peripheral target apertures UY, LY, RX, and LX. At step 714, the computer/processor system 216 instructs the collimator position controller 210 to rotate the collimator assembly 206 by a defined angular interval along the x-axis (i.e., horizontal direction) and record the location, size, and/or intensity of the resulting spot on the image sensor 510. For example, the embodiment illustrated in FIG. 5a illustrates the rotation of the collimator assembly 206 by a defined angular interval. In some embodiments, this step may be repeated a number of times in both the positive x-axis direction and negative x-axis direction, with the location, size and/or intensity of the spot recorded with respect to each angular interval or position of the collimator assembly 206. At step 716, the same process is repeated but with respect to the z-interval (i.e., vertical direction). Based on the feedback received from at steps 714 and 716 a distortion profile is constructed with respect to the camera 218.

At step 718, a center of distortion (COD) associated with the camera 218 is determined based on the location on the image plane where spot intensity symmetry is uniform between the plurality of peripheral spots corresponding with collimated light provided through the plurality of peripheral target apertures UY, LY, RX, and LX. In some embodiments, this requires the central target aperture OA to be selectively closed. In other embodiments, the central target aperture may remain open during the determination of the COD. In some embodiments, in addition to COD the focal length FL of the camera 218 is determined based on the lateral displacement x of the OA spot measured when the collimator 202 is rotated over a known angle Θ. The FL is given by the following equation:

$$FL = x/\tan \Theta$$

For example, the OA spot is measured with the collimator at a first location. The collimator 202 is rotated an interval Θ to a second location and the OA spot is measured. The distance between the first OA spot and the second OA spot is the distance x. Based on these inputs, the focal length FL can be determined.

As a result of the method described with respect to FIG. 7, intrinsic parameters associated with the camera 218 are determined, including one or more of principal point (PP), center-of-distortion, distortion profile, and focal length. In some embodiments, these intrinsic parameters of the camera 218 are utilized to build a profile utilized to correct distortions in captured images. In some embodiments, the profile is stored to the memory of the camera 218.

Discussion of Possible Embodiments

The following are non-exclusive descriptions of possible embodiments of the present invention.

According to one aspect, a method of calibrating intrinsic parameters associated with a camera includes positioning a camera to receive collimated light from a rotatable collimator, wherein the collimated light is provided to the camera via a target having a central target aperture and a plurality of peripheral target apertures located on a periphery of the target. The method further includes rotating the collimator along a first axis extending through an entrance pupil location of the camera and recording spot positions associated with collimated light provided through one or more target apertures of the target at each first axis interval and determining a distortion profile associated with the camera based on the recorded spot positions measured at the plurality of first axis intervals.

The method of the preceding paragraph can optionally include, additionally and/or alternatively any, one or more of the following features, configurations and/or additional components.

For example, in some embodiments the central target aperture and the plurality of peripheral target apertures are selectively opened and closed, wherein spot positions recorded at each first axis interval may include peripheral spot positions associated with collimated light provided through select peripheral target aperture, OA spot positions associated with collimated light provided through the central target aperture, or spot positions associated with collimated light provided through both the central target aperture and the plurality of peripheral target apertures.

In some embodiments, the method further includes aligning the camera with the rotatable collimator.

In some embodiments, aligning the camera with the rotatable collimator includes selectively opening/closing the plurality of peripheral target apertures to ensure each peripheral target aperture is visible to the camera.

In some embodiments, aligning the camera with the rotatable collimator includes modifying a position of the camera via selective panning/tilting of the camera to minimize a size of the spot generated by collimated light provided through the plurality of peripheral target apertures and the central target aperture.

According to some embodiments, the method further includes selectively closing the plurality of peripheral target apertures and measuring a position of an OA spot generated by collimated light provided through the central target aperture.

According to some embodiments, the method further includes determining a center of distortion (COD) based on a comparison of spot intensity symmetry being uniform between spots generated by collimated light provided through the plurality of peripheral target apertures.

According to some embodiments, the method further includes selectively opening the central target aperture and closing the plurality of peripheral target apertures and then recording a first position of an OA spot generated by collimated light provided through the central target aperture. The method may further include rotating the collimator to a second position by an angular interval and recording a second position of the OA spot generated by collimated light provided through the central target aperture. The lateral displacement of the OA spot with respect to the first position and the second position is measured and utilized to determine a focal length of the camera.

According to some embodiments, the method further includes rotating the collimator along a second axis extending through the entrance pupil location of the camera perpendicular to the first axis and recording positions of spots provided through one or more of the central target aperture and the plurality of peripheral target apertures at each second axis interval, wherein the distortion profile of the camera is further determined based on the recorded positions of spots measured at the plurality of second axis intervals.

According to some embodiments, rotating the collimator along a second axis extending through the entrance pupil location of the camera perpendicular to the first axis further includes rotating the camera ninety degrees relative to the rotatable collimator.

According to another aspect, a camera calibration system includes a rotatable collimator and a camera fixture. The rotatable collimator includes a tube and a target located within the tube, the target having a central target aperture and a plurality of peripheral target apertures located radially outward of the central target aperture, wherein the rotatable collimator is rotatable about a first axis. The camera fixture is configured to receive a camera and to locate an entrance pupil location of the camera through the first axis of the rotatable collimator.

The camera calibration system of the preceding paragraph can optionally include, additionally and/or alternatively any, one or more of the following features, configurations and/or additional components.

For example, in some embodiments the peripheral target apertures include four target apertures equidistant from one another along a periphery of the target.

In some embodiments, each peripheral target aperture includes a magnetic shutter selectively controllable to open and close the shutter associated with each target aperture.

In some embodiments, the central target aperture includes a magnetic shutter selectively controllable to open and close the shutter associated with the central target aperture.

In some embodiments, the tube has a first internal diameter.

In some embodiments, the camera fixture mounts a camera having a lens aperture approximately equal in diameter to the first internal diameter.

In some embodiments, the camera calibration system further includes a control system, wherein the control system includes one or more of an alignment controller and a rotary stage controller. The alignment controller may be configured to control alignment of the camera relative to the rotatable collimator. The rotary stage controller may be configured to control rotation of the rotatable collimator about the first axis.

In some embodiments, the camera calibration system further includes a computer including a processor and computer readable medium, the computer in communication with the alignment controller, the rotary stage controller, and an image processor, wherein the processor executes instructions stored on the computer readable medium to modify a position of the camera using the alignment controller based on feedback received from the image processor in order to align the camera with the rotatable collimator and modify an angular position of the rotatable collimator and record one or more spots associated with collimated light provided through one or more apertures of the target at each angular position of the rotatable collimator.

In some embodiments, the processor executes instructions stored on the computer readable medium to further determine a principle point (PP) based on a location of an OA spot provided through the central target aperture of the target after alignment of the camera with the rotatable collimator and to determine a distortion profile of the camera based on the spots recorded at each of the plurality of angular positions of the rotatable collimator.

The invention claimed is:

1. A method of calibrating intrinsic parameters associated with a camera, the method comprising:
    positioning a camera having an aperture to receive collimated light from a rotatable collimator having a tube and a target located within the tube, wherein the target includes a central target aperture located in a center of the target and a plurality of peripheral target apertures located around a periphery of the target, wherein collimated light is provided to the aperture of the camera via one or more of the central target aperture and the plurality of peripheral target apertures;
    rotating the collimator along a first axis extending through an entrance pupil location of the camera and recording spot positions associated with collimated light provided through one or more of the central target aperture and plurality of peripheral target apertures of the target at a plurality of first axis intervals; and
    determining a distortion profile associated with the camera based on the recorded spot positions measured at the plurality of first axis intervals.

2. The method of claim 1, wherein the central target aperture and the plurality of peripheral target apertures are selectively opened and closed, wherein spot positions recorded at each first axis interval may include peripheral spot positions associated with collimated light provided through select peripheral target aperture, OA spot positions associated with collimated light provided through the central target aperture, or spot positions associated with collimated light provided through both the central target aperture and the plurality of peripheral target apertures.

3. The method of claim 1, further including aligning the camera with the rotatable collimator.

4. The method of claim 3, wherein aligning the camera with the rotatable collimator includes selectively opening/closing the plurality of peripheral target apertures to ensure each peripheral target aperture is visible to the camera.

5. The method of claim 4, wherein aligning the camera with the rotatable collimator includes modifying an position of the camera via selective panning/tilting of the camera to minimize a size of the spot generated by collimated light provided through the plurality of peripheral target apertures and the central target aperture.

6. The method of claim 1, further including selectively closing the plurality of peripheral target apertures and measuring a position of an OA spot generated by collimated light provided through the central target aperture.

7. The method of claim 6, further including determining a center of distortion (COD) based on a comparison of spot intensity symmetry being uniform between spots generated by collimated light provided through the plurality of peripheral target apertures.

8. The method of claim 1, further including:
    selectively opening the central target aperture and closing the plurality of peripheral target apertures;
    recording a first position of an OA spot generated by collimated light provided through the central target aperture;
    rotating the collimator to a second position by an angular interval;
    recording a second position of the OA spot generated by collimated light provided through the central target aperture;

measuring lateral displacement of the OA spot with respect to the first position and the second position; and
determining a focal length of the camera based on the lateral displacement and the angular interval.

9. The method of claim 1, further including rotating the collimator along a second axis extending through the entrance pupil location of the camera perpendicular to the first axis and recording positions of spots provided through one or more of the central target aperture and the plurality of peripheral target apertures at each second axis interval, wherein the distortion profile of the camera is further determined based on the recorded positions of spots measured at the plurality of second axis intervals.

10. A camera calibration system, comprising:
a rotatable collimator having a tube and a target located within the tube, the target having a central target aperture and a plurality of peripheral target apertures located radially outward of the central target aperture, wherein the rotatable collimator is rotatable about a first axis; and
a camera fixture configured to receive a camera having a camera aperture and align the camera aperture with the rotatable collimator, wherein the first axis extends through an entrance pupil location of the camera and is approximately perpendicular to the optical axis of the camera, wherein collimated light is provided through one or more of the central target aperture and the plurality of peripheral target apertures to the camera aperture, and wherein a distortion profile associated with the camera is determined based on recorded spot positions measured at the plurality of intervals about the first axis.

11. The camera calibration system of claim 10, wherein the peripheral target apertures include four target apertures equidistant from one another along a periphery of the target.

12. The camera calibration system of claim 10, wherein each peripheral target aperture includes a magnetic shutter selectively controllable to open and close the shutter associated with each target aperture.

13. The camera calibration system of claim 12, wherein the central target aperture includes a magnetic shutter selectively controllable to open and close the shutter associated with the central target aperture.

14. The camera calibration system of claim 10, wherein the tube has a first internal diameter.

15. The camera calibration system of claim 14, wherein the camera fixture mounts a camera having a lens aperture approximately equal in diameter to the first internal diameter.

16. The camera calibration system of claim 10, further including:
a control system comprising:
an alignment controller configured to control alignment of the camera relative to the rotatable collimator; and
a collimator position controller configured to control rotation of the rotatable collimator about the first axis.

17. The camera calibration system of claim 16, wherein the collimator position controller is further configured to control rotation of the rotatable collimator about a second axis perpendicular to the first axis, wherein the second axis extends through the entrance pupil location of the camera and is approximately perpendicular to the optical axis of the camera.

18. The camera calibration system of claim 16, further including a computer including a processor and computer readable medium, the computer in communication with the alignment controller, the collimator position controller, and an image processor, wherein the processor executes instructions stored on the computer readable medium to:
modify a position of the camera using the alignment controller based on feedback received from the image processor in order to align the camera with the rotatable collimator;
modify an angular position of the rotatable collimator and record one or more spots associated with collimated light provided through one or more apertures of the target at each angular position of the rotatable collimator.

19. The camera calibration system of claim 18, wherein the processor executes instructions stored on the computer readable medium to further:
determine a principle point (PP) based on a location of an OA spot provided through the central target aperture of the target after alignment of the camera with the rotatable collimator; and
determine a distortion profile of the camera based on the spots recorded at each of the plurality of angular positions of the rotatable collimator.

20. The camera calibration system of claim 18, wherein the processor executes instructions stored on the computer readable medium to determine a focal length of the camera based on a lateral displacement of the OA spot measured in response to a change in the angular position of the rotatable collimator by a known angle $\Theta$.

* * * * *